United States Patent [19]

Gibbon et al.

[11] Patent Number: 5,587,750
[45] Date of Patent: Dec. 24, 1996

[54] FILM TRANSPORT MECHANISM

[75] Inventors: Michael A. Gibbon; Ian Maxwell, both of Oakville, Canada; Marian Toporkiewicz, Vorau, Austria

[73] Assignee: IMAX Corporation, Toronto, Canada

[21] Appl. No.: 646,581

[22] Filed: May 8, 1996

[51] Int. Cl.$^6$ .................................................. G03B 1/00
[52] U.S. Cl. ............................................................ 352/184
[58] Field of Search ................................. 352/159, 184, 352/228; 226/155

[56] References Cited

U.S. PATENT DOCUMENTS

| | | | |
|---|---|---|---|
| 3,494,524 | 2/1970 | Jones | 352/159 |
| 3,600,073 | 8/1971 | Shaw | 352/184 |
| 3,794,415 | 2/1974 | Jones | 352/184 |
| 4,039,256 | 8/1977 | Teeple, Jr. et al. | 352/184 |
| 4,114,996 | 9/1978 | Shaw | 352/184 |
| 4,365,877 | 12/1982 | Shaw | 354/184 |
| 4,441,796 | 4/1984 | Shaw | 352/184 |

*Primary Examiner*—Safet Metjahic
*Assistant Examiner*—Eddie C. Lee
*Attorney, Agent, or Firm*—Bereskin & Parr

[57] ABSTRACT

A compact rolling loop motion picture projector has a rotor of significantly smaller diameter than a conventional such rotor. The radius of curvature of the rotor is selected to be significantly less than the radius of curvature of a film flattener element on which the film is located for projection, and the axis of rotation of the rotor is offset towards a film input sprocket of the projector so as to maintain a minimum film gap between the rotor and the field flattener upstream of the optical axis of the projector. The compact rotor is rotationally supported from above by a "spider" and a projection lamp is located below the rotor for compactness and efficiency of lamp operation.

11 Claims, 5 Drawing Sheets

FILM TRANSPORT MECHANISM

FIELD OF THE INVENTION

This invention relates generally to a mechanism for intermittently transporting film past a stationary point such as an aperture in a motion picture projector, camera or the like. The term "film" is to be interpreted broadly as including tape or other like elements.

BACKGROUND OF THE INVENTION

The invention has been devised primarily in the context of what are known as "rolling loop" motion picture projectors, although it is to be noted that the invention is not limited to mechanisms for use in optical projection or recording systems. U.S. Pat. No. 3,494,524 to Jones discloses the principle of a rolling loop film transport mechanism. Briefly, the Jones mechanism includes a rotor having gaps and a curved stator for guiding the film between the rotor and the stator. As the rotor rotates, successive loops of film are formed in the rotor gaps, causing the film to move through one frame length each time the loop passes a stationary registration pin on the stator. Each loop is developed continuously in a rotor gap by a driven input sprocket as the gap travels from a film inlet location to a projection aperture. The loop then decays continuously as it travels from the aperture to a driven output sprocket. The registration pin is located adjacent the aperture for locating the film during projection.

A number of improvements in the original Jones mechanism are disclosed in U.S. Pat. Nos. 3,600,073; 4,365,877; and 4,441,796 (all to Shaw).

Generally speaking, existing rolling loop projectors are relatively large and complex, and hence expensive to make. For example, the rotor may have an overall diameter of about 40 inches ($10^{16}$ millimeters) in the case of a projector for a 15 perforation 70 mm film format. For other formats, the same considerations apply but the actual size varies. As such, the projectors also take up significant floor space, i.e. require large projection rooms in theatres. Typically (though not necessarily), the rotor of a rolling loop projector rotates in a horizontal plane (about a vertical axis) and sufficient space must be allowed for ancillary equipment such as film platters and other ancillary devices as well as for access to the projector by the operator and maintenance personnel.

A projector normally includes a so-called "field flattener" lens element at the position of the aperture, on which successive frames of the film are laid for projection, as the film is advanced through the projector (see for example U.S. Pat. Nos. 4,365,877 and 4,441,796 (Shaw)). The optical characteristics of the field flattener lens element are quite critical to proper projection. In particular, the face of the field flattener lens element on which the film is laid must have a precise shape. Traditionally, that face is defined by an arc centered on the rotational axis of the rotor, and the radius of the rotor is selected to match the curvature of the lens element face so as to maintain a uniform gap between the lens element and the rotor. Precise control and positioning of the film at the point of projection is of course critical to projected image quality and it was thought that the provision of a uniform gap between the field flattener and the rotor was essential to achieve this. As a result, it was believed that the radius of the rotor could not be reduced below a minimum determined by the curvature of the field flattener face.

BRIEF DESCRIPTION OF THE INVENTION

An object of the present invention is to provide improvements in a rolling loop film transport mechanism which are aimed at permitting simplification, and in particular reduction in size and cost of the mechanism as a whole and/or permitting the use of a film support elements having film support surface with a radius of curvature which is infinitely large.

One aspect of the invention provides a mechanism for intermittently transporting film past a stationary film support element, in which the mechanism includes a rotor rotatable about an axis and having a defined radius of curvature centered on said axis, and stator means co-operating with the rotor to define a film passage, and including said film support element, the element having a film supporting surface forming part of said film passage. Means is provided upstream of the film support element for feeding film into the film passage at an input location, and means is provided downstream of the film support element for receiving film from said film passage at an output location. The rotor has gaps for receiving loops formed in film fed into the film passage, and the rotor is rotatable about its said axis for transporting film through the film passage from the input location to the output location, so that successive portions of the film are laid onto and momentarily remain stationary on the film support surface of the film support element. The film support surface has a radius of curvature centered on a defined axis which extends through the said surface. The radius of curvature of the rotor is significantly smaller than the radius of curvature of the film support surface. Preferably, the rotational axis of the rotor is offset from the said axis in a direction towards the film input location by an amount sufficient to provide a predetermined minimum gap between the rotor and the film support surface at a point upstream of said optical axis.

In this context, the terms "upstream" and "downstream" of course relate to the direction of film travel through the mechanism.

It will be understood from the foregoing that the invention is based on the realization that it is in fact possible to significantly reduce the diameter of the rotor. In order to better control the film, the axis of rotation of the rotor preferably is offset from the optical axis of the film support element in a direction towards the input side of the element by an amount sufficient to provide a gap at the upstream side of the film support element which is adequate to maintain proper control of the film. Hitherto, conventional practice has been to maintain a uniform film gap across the entire face of the film support element. The present invention is based on the realization that this is not essential.

It may be important that the gap not be allowed to become too large over the remainder of the lateral extent of the film support surface (i.e. towards the downstream end of the gap). It has been found that it may be desirable to contour the film support element or its housing beyond the normal upstream and/or downstream extent of the element, to curve back towards the rotor for maintaining a reasonable gap width.

By way of example, in a traditional rolling loop projector, the practice is to maintain a gap between the film support element and the rotor which is a minimum sufficient to allow film to pass, including splices, and to ensure that this gap is uniform over the entire lateral extent of the film support element. In accordance with a preferred embodiment of the present invention, it has been found that proper film control can be achieved if this gap width is maintained at a point upstream of the optical centerline of the film support element assembly. This in turn allows a reduction in diameter of the rotor and consequent simplification of the mechanism as a whole. For example, the rotor may be reduced to approximately half its normal diameter, namely to 20 inches (508 millimeters) for a 15 perforation 70 mm format projector. Depending on the extent of the shift or offset of the rotor axis, the maximum gap width at the input end of the film support surface might be about twice the minimum gap and the maximum gap at the downstream end might be about six times the minimum gap.

Other aspects of the present invention provide a camera, projector or like motion picture apparatus which incorporates a film transport mechanism of the form referred to previously, and an improvement in such a mechanism.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF PREFERRED EMBODIMENT

Before referring in detail to the drawings, it should be noted that the basic principles of operation of a rolling loop motion picture projector are well known and described in the Jones and Shaw patents referred to previously, the disclosures of all of which are incorporated herein by reference. Accordingly, detailed description of those basic principles is believed unnecessary here. The drawings therefore show only the principal components of the projector and such detail as is necessary for a full understanding of the present invention.

Figure 1:
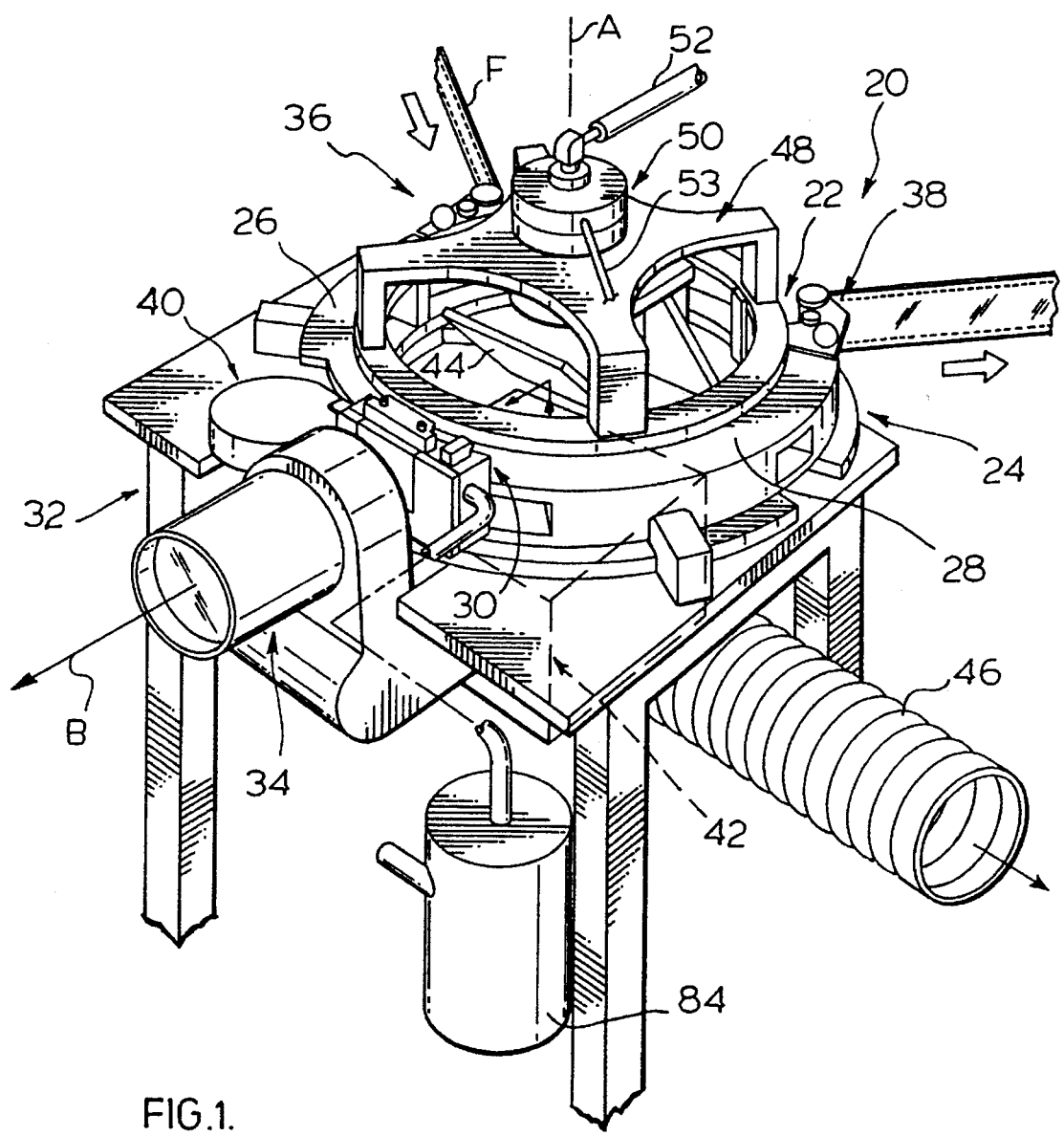
FIG. 1 is a perspective view from above and to one side of a rolling loop film projector in accordance with a preferred embodiment of the invention.

Referring first to FIG. 1, the projector is generally denoted by reference numeral 20 and includes a rotor 22 and fixed stator means generally indicated at 24 and including an input stator 26, an output stator 28. A field flattener lens element assembly 30 is located between the input stator and the output stator. The stators and the assembly 30 are is mounted on a fixed frame generally denoted 32, which also carries a projection lens assembly 34 associated with the field flattener assembly 30. The optical axis of the lens assembly 34 (and of the field flattener assembly 30) is indicated at B.

Figure 4:
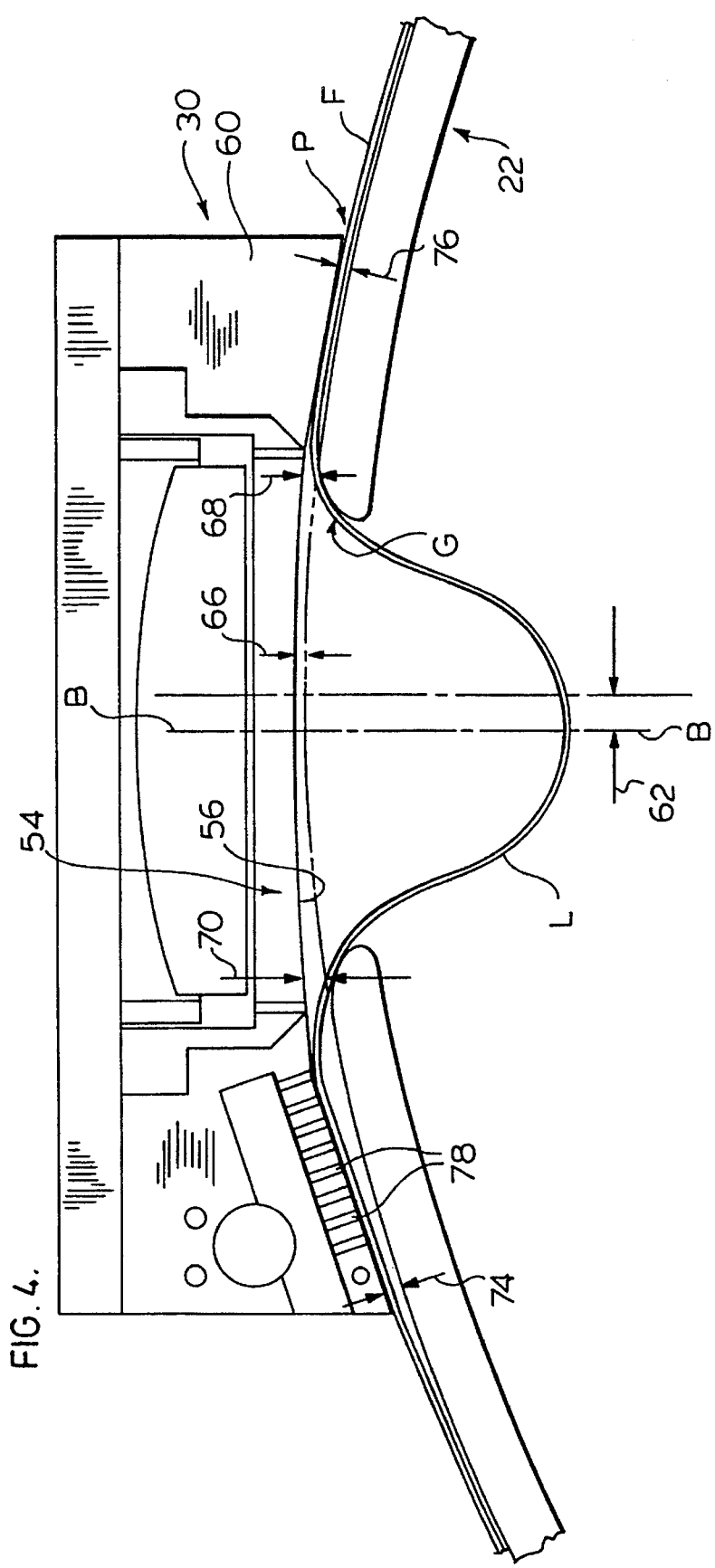
FIG. 4 is a plan view corresponding to FIG. 3.

As discussed previously, the stator means 24 co-operates with the rotor 22 to define a film passage which includes the field flattener lens element assembly 30. The film passage is generally indicated in FIG. 4 at P. FIG. 4 also shows one of the rotor gaps G receiving a loop L of film F.

Reverting to FIG. 1, film F is shown being fed into the film passage P by an input sprocket assembly 36 at an input location. FIG. 1 also shows an output sprocket assembly 38 at an output location, for receiving film at the downstream end of the film passage P.

As described in detail in the Jones and Shaw patents referred to previously, the film is continuously fed into the film passage by the input sprocket assembly 36 as the rotor 22 rotates, so that loops L of film are formed in successive rotor gaps, in travelling towards the aperture of the projector, in FIG. 1 represented by the field flattener assembly 30. Successive portions of the film (corresponding to successive frames) are progressively laid flat onto the field flattener. The loops then progressively decay as the rotor rotates towards the output sprocket assembly 38, from where the film leaves the projector. A cam unit 40 is provided immediately upstream of the field flattener assembly 30 for decelerating successive portions of film as they approach the field flattener, again as described in the patents referred to previously.

In contrast to conventional rolling loop projectors, not only is the rotor significantly smaller than a conventional rotor, but rotor 22 is rotationally supported from above. Also, the projection lamp of the projector is mounted below the rotor for illuminating the film. This arrangement also contributes to overall compactness of the projector as a whole. As shown in FIG. 1, the projection lamp house is generally indicated by reference numeral 42 and is arranged to project light upwardly to a mirror 44 by which the light is projected forwardly along optical axis B through the film, the field flattener assembly 30 and the lens assembly 34. Cooling air for the lamp house is exhausted through a hose 46. Mounting the lamp below the rotor is also more efficient in terms of lamp operation.

Rotor 22 is supported from above by a "spider" 48 (a frame with radiating arms) carried by a bearing 50 at the upper end of a vertical drive shaft (not shown). Below support 32, a single drive motor and a belt drive arrangement provides drive to the rotor 22, the input and output sprocket assemblies 36 and 38 respectively and the cam unit 40. Bearing 50 also incorporates a rotary air manifold for providing pressurized air at the locations on the rotor adjacent the gaps G for film cushioning purposes, as described in the '073 Shaw patent supra. An air inlet hose is shown at 52 and one of a number of air outlet hoses is indicated at 53.

Figure 3:
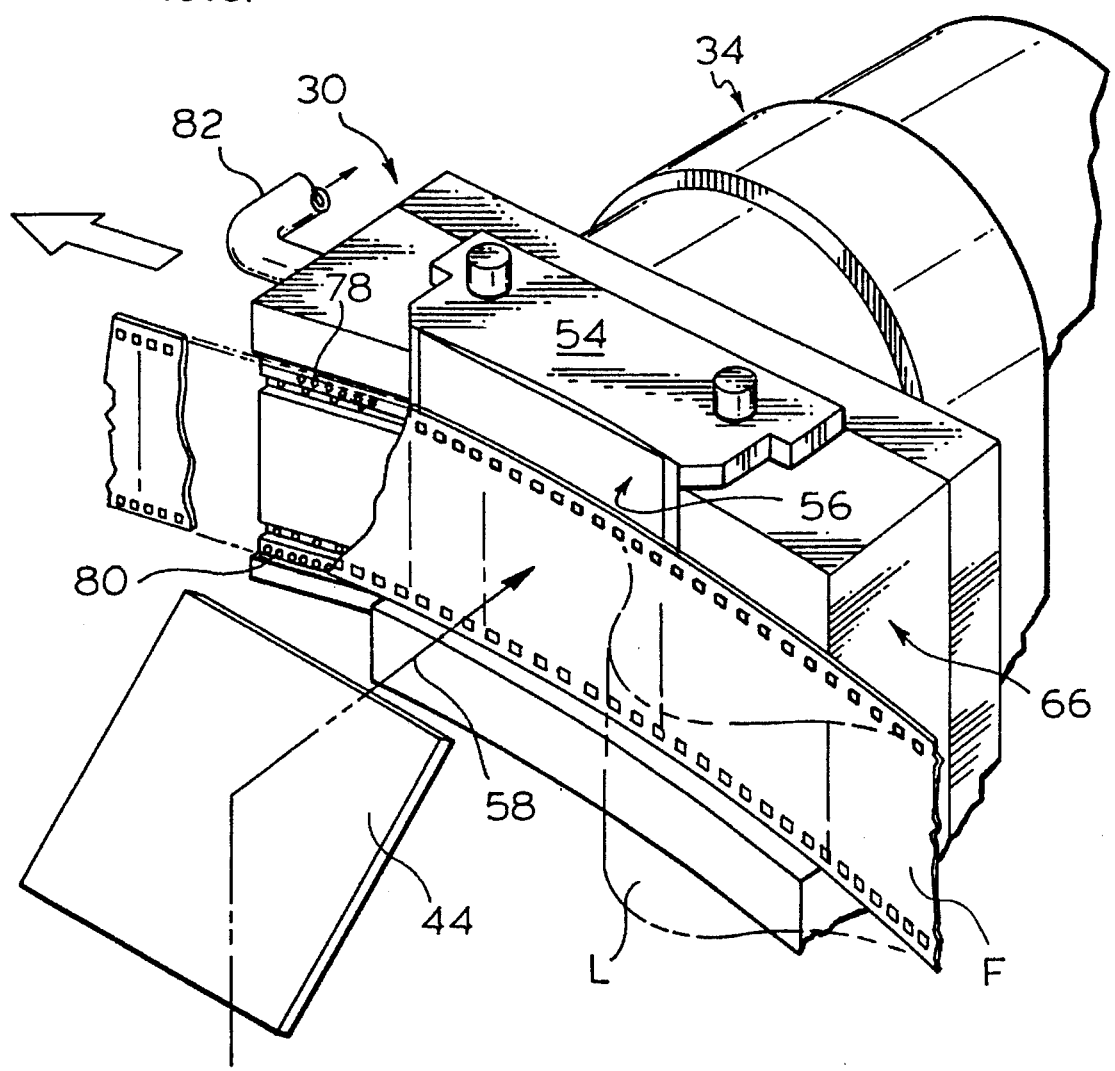
FIG. 3 is a detail perspective view from the rotor side of the projector showing the film laid onto the field flattener lens element.

Referring now to FIG. 3, the field flattener lens element assembly 30 is shown as seen from the "rotor side", i.e. looking towards the lens assembly 34. Assembly 30 includes a replaceable optical element known as a field flattener lens element, which is denoted 54. The field flattener has an optical surface 56 at its inner (film) side, on which successive portions of the film F are laid for projection as the film is transported past assembly 30. The arrow 58 in FIG. 3 represents light from the lamp house 42 that is being reflected off mirror 44 through the film for projection by lens assembly 34. As described in the Jones and Shaw patents supra, the rotor is provided with shutters that cover the gaps G in the rotor, and hence the film loops L so that the light from the lamp house is intermittently obscured by the shutters between projection of successive frames as the gaps pass the field flattener assembly 30.

Optical element 54 is mounted for vertical sliding movement in a housing 60 so that the element can be replaced and/or cleaned to remove dust, film particles and other debris that tends to accumulate on surface 56 during operation of the projector.

Figure 5:
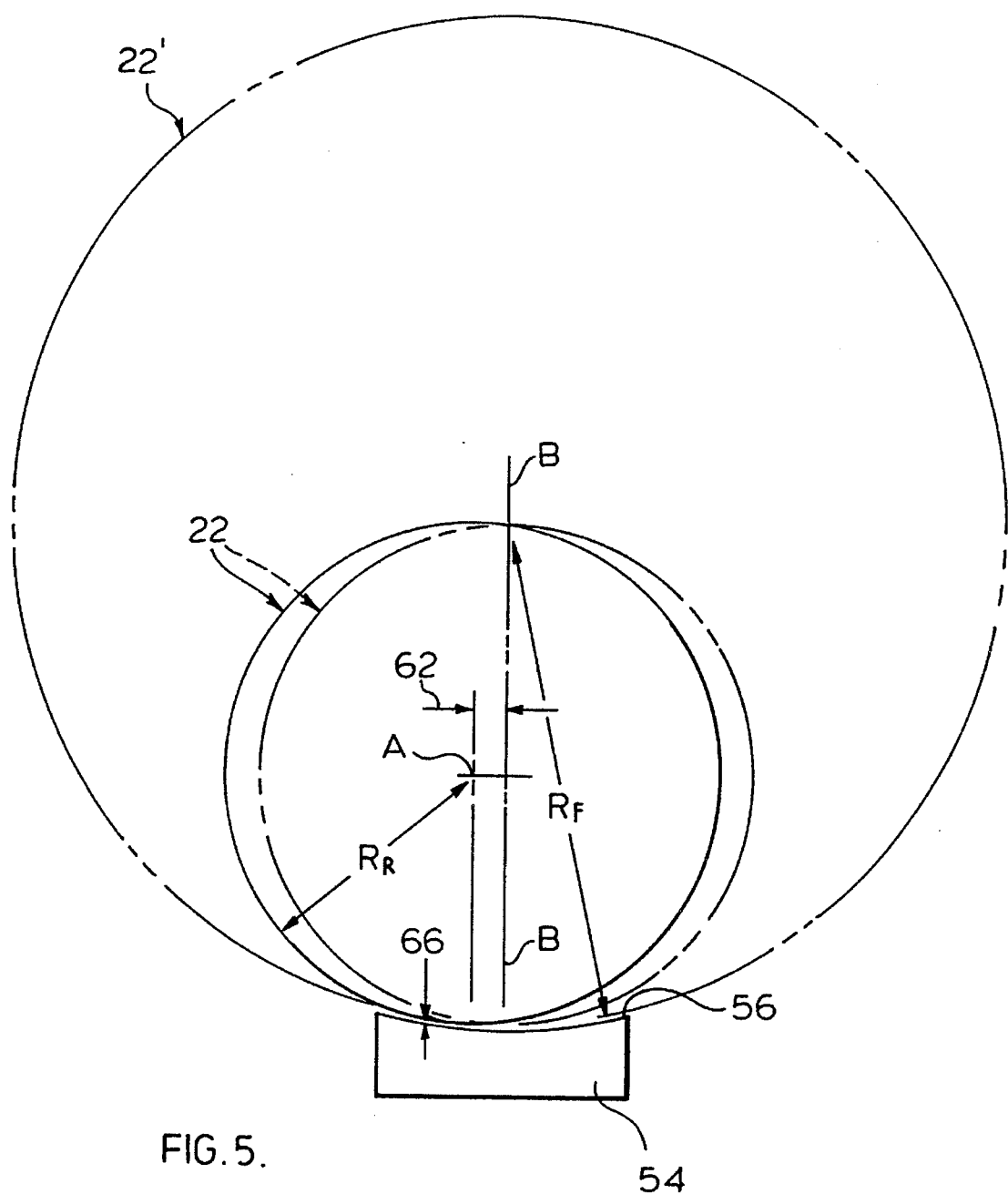
FIG. 5 is a diagrammatic plan view schematically illustrating the reduction in rotor size and rotor axis offset in accordance with the present invention.

FIG. 5 is a diagrammatic plan view showing the field flattener optical element 54 in association with the rotor 22. The optical axis of the projector is denoted B—B (to agree with FIG. 1) and the rotational axis of the rotor 22 is indicated at A. The large circle shown in ghost outline and denoted 22' indicates the diameter of a typical conventional rotor.

The film support surface 56 of field flattener element 54 has a defined radius of curvature which is centered on the optical axis B. This radius is typically very large and may even be infinitely large (i.e. the surface 56 may be flat). In the preferred embodiment being described (15 perforation 70 mm format), the radius of curvature of surface 56 may be of the order of 20 inches (508 mm). In FIG. 5, that radius is denoted $R_F$. In a typical rolling loop projector, the radius of the rotor is selected to be the same as the radius of curvature of the film support surface 56 so that the curvature of the rotor matches the curvature of surface 56 and a uniform gap can be maintained over the entire lateral extent of surface 56. In other words, the rotor would also have a radius of 20 inches (508 mm). The spacing between the rotor and the field flattener element 54 would be selected to maintain a minimum gap sufficient to allow film to pass including splices.

In accordance with the present invention, the radius of curvature of the rotor ($R_R$) is selected to be significantly smaller than the radius of curvature of surface 56, for example in a range of from ¼ to ¾ of the radius of curvature of surface 56. In the preferred embodiment shown, the rotational axis A of the rotor is also offset from the optical axis B—B in a direction towards the film input location (input sprocket assembly 36) by an amount sufficient to provide a minimum film gap between the rotor and surface 56 at a point upstream of the optical axis B—B. As noted previously, it has been found that it is not necessary to maintain a uniform gap over the entire lateral extent of surface 56. In the preferred embodiments, it has been found that proper film control can be maintained if an appropriate gap is present upstream of axis B—B. In this embodiment (a 15 perforation 70 mm format), the radius of curvature ($R_R$) of the rotor is reduced by half, i.e. to 10 inches (254 mm) and the rotor is offset by an amount indicated in FIG. 5 by the arrows denoted 62. The small circle 22 shown in ghost outline represents the position that the rotor would have occupied but for the offset. Typically, the offset is about ⅛ to 1/12 of the aperture width. For example, if the aperture width is 2½ inches, the offset could be about 1/10 of that amount, about 0.25 inches.

Figure 2A:
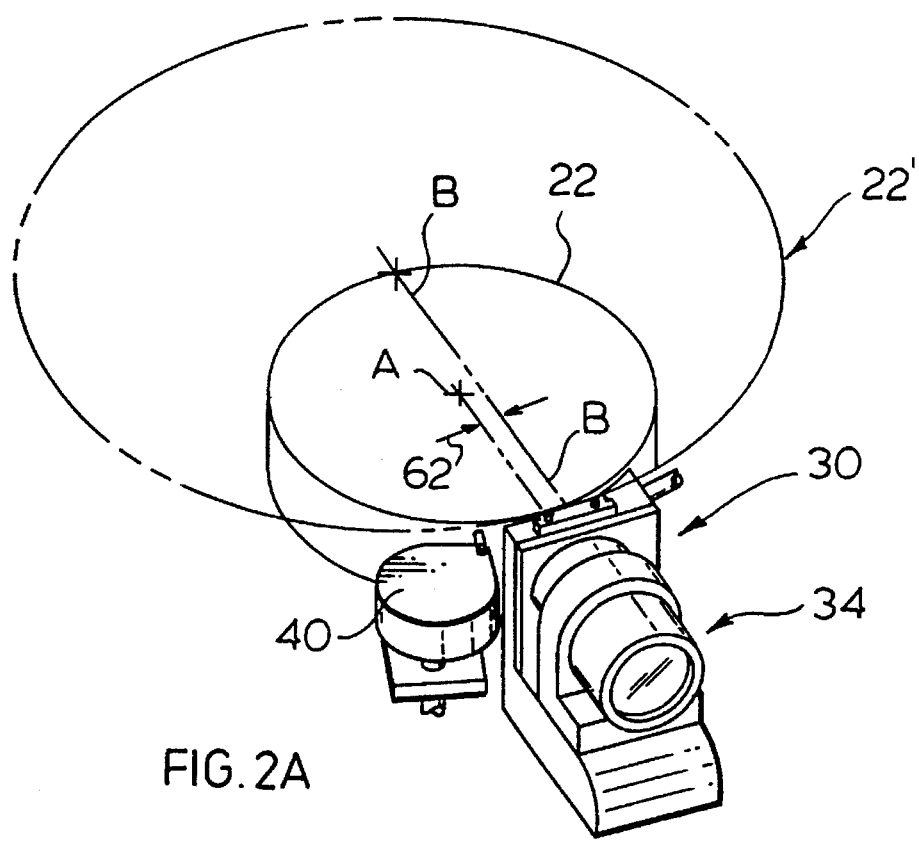
FIG. 2a is a perspective view from the opposite side as compared with FIG. 1, illustrating in diagrammatic form, the reduction in rotor size and the offset in the rotor axis, as compared with a conventional projector.
Figure 2B:
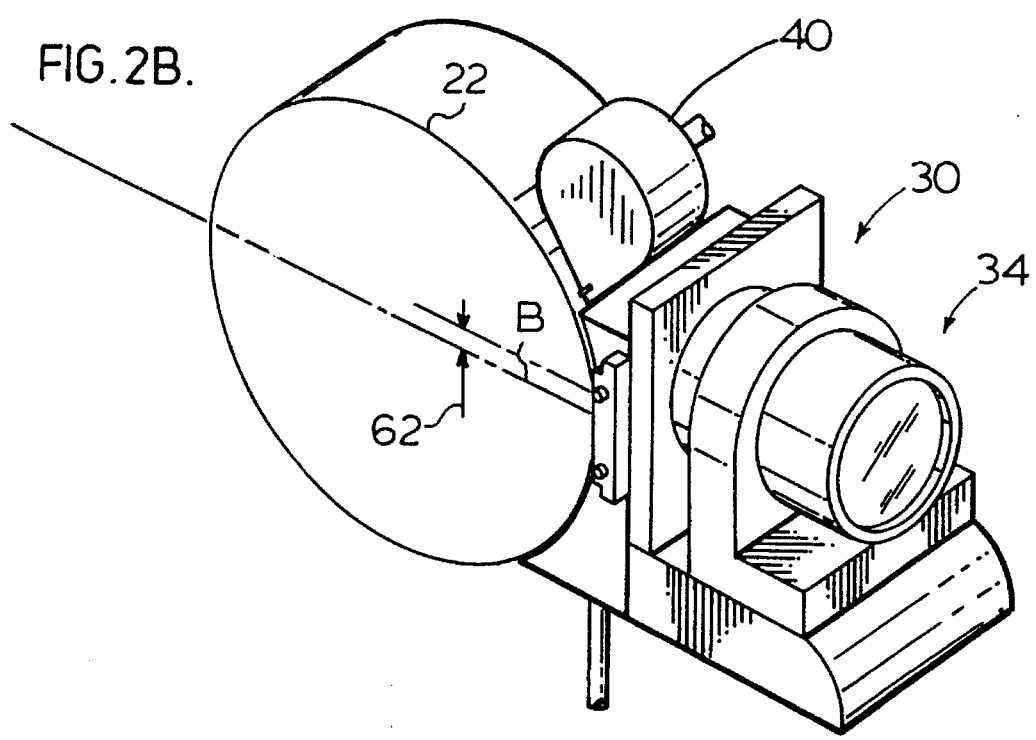
FIG. 2b is a view similar to FIG. 2a, but showing an embodiment in which the rotor is disposed in a vertical plane and is rotatable about a horizontal axis.

FIG. 2a shows the rotor size and offset as compared with a conventional rotor, while FIG. 2b illustrates the fact that the rotor can be mounted vertically for rotation about a horizontal axis.

FIG. 4, also shows the rotor offset at 62. The minimum gap width is indicated by the arrow 66. The maximum width at the input side of the field flattener element is indicated at 68 and may be of the order of twice the minimum gap. The maximum gap width may be of the order of six times the minimum and occurs at the output end of element 54, as indicated at 70. In this embodiment, the minimum gap (66) occurs approximately at a spacing from axis B—B equal to about twice the rotor offset (62). It is believed that the spacing preferably should be in a range of about 0.5 to 3 times the rotor offset.

FIG. 4 also shows that the housing 60 for optical element 54 may be contoured to in effect further reduce the film gap to approximately the minimum gap at both the upstream and downstream end of the housing as indicated at 74 and 76 respectively. Housing 60 is not an optical element because it is outside the path of the projected image.

If required for proper control of the film, suction means may be provided downstream of element 54 for drawing the film towards the surface of the holder. As best seen in FIG. 3, these suction means may comprise respective series 78 and 80 of suction ports located outwardly of the image area of the film, i.e. for drawing marginal areas of the film toward the holder. Reference numeral 82 indicates a suction hose communicating with the port 78 and 80. Hose 82 leads to a suction source 84 shown generally in FIG. 1.

It will of course be appreciated that the preceding description relates to particular preferred embodiments of the invention and that many modifications are possible.

As indicated previously, within the broad scope of the invention, it is not necessary that the rotor be offset from the optical axis of the projector. Contrary to expectation in the art, it is believed that proper film control can be achieved even without a rotor offset.

Further, while the drawings show a projector, it is evident that the film transport mechanism provided by the invention could be used in a camera or other optical apparatus or, more generally, in any appropriate form of apparatus in which film is transported, e.g. a tape transport apparatus. It should also be noted that while some emphasis has been given to a horizontal projector configuration (with the rotor rotating about a vertical axis) there is no limitation to any particular rotor orientation.

Finally, it should be noted that the specific dimensions of rotors and offsets mentioned in the disclosure generally apply to a 15 perforation 70 mm film format. The invention is not limited to this particular format, and is applicable to other film formats such as 4 and 8 perforation 35 mm, 5 and 8 perforation 70 mm. The relative offsets and dimensions for these other formats may differ from the dimensions for the 15 perforation 70 mm format.

We claim:

1. A mechanism for intermittently transporting film past a stationary film support element, the mechanism comprising:

a rotor rotatable about an axis and having a defined radius of curvature centered on said axis;

stator means co-operating with the rotor to define a film passage and including said film support element, said element having a film support surface forming part of said film passage;

means upstream of said film support element for feeding film into said film passage at an input location; and, means for receiving film from said film passage at an output location downstream of said film support element;

the rotor having gaps for receiving loops formed in film fed into said film passage and the rotor being rotatable about said axis to transport film through said film passage from said input location to said output location, so that successive portions of the film are laid onto and momentarily remain stationary on said film support surface of the film support element;

wherein the said film support surface has a radius of curvature centered on a defined axis, wherein said radius of curvature of the rotor is significantly smaller than the radius of curvature of the film support surface, and wherein the said rotational axis of the rotor is offset from said defined axis in a direction towards said film input location by an amount sufficient to provide a predetermined minimum gap between the rotor and the film support surface at a point upstream of said defined axis.

2. A camera, projector or like optical apparatus having a mechanism for intermittently transporting film past a stationary film support element, the mechanism comprising:

a rotor rotatable about an axis and having a defined radius of curvature centered on said axis;

stator means co-operating with the rotor to define a film passage and including said film support element, said element having a film support surface forming part of said film passage;

means upstream of said film support element for feeding film into said film passage at an input location; and means for receiving film from said film passage at an output location downstream of said film support element;

the rotor having gaps for receiving loops formed in film fed into said film passage and the rotor being rotatable about said axis to transport film through said film passage from said input location to said output location, so that successive portions of the film are laid onto and momentarily remain stationary on said film support surface of the film support element;

wherein the said film support surface has a defined radius of curvature centered on an optical axis, and wherein said radius of curvature of the rotor is significantly smaller than the radius of curvature of the film support surface, and said rotational axis of the rotor is offset from said optical axis in a direction towards said film input location by an amount sufficient to provide a predetermined minimum gap between the rotor and the film support surface at a point upstream of said optical axis.

3. An apparatus as claimed in claim 2, wherein the radius of curvature of the rotor is approximately one half of the radius of curvature of the film support surface of the film support element.

4. An apparatus as claimed in claim 2, wherein the radius of curvature of the film support surface is infinitely large.

5. An apparatus as claimed in claim 2, including an aperture having a defined width, wherein the rotor is offset from said optical axis by a distance in a range of about ⅛ to 1/12 of the aperture width.

6. An apparatus as claimed in claim 2, wherein the rotor is rotatable in a generally horizontal plane about a generally vertical axis, and wherein the apparatus further comprises rotor support means comprising a spider rotationally supported on said rotor axis and disposed above the rotor and supporting the same from above, and projection means including a projector lamp house disposed below the rotor and arranged to project light upwardly for reflection through said film.

7. An apparatus as claimed in claim 2, wherein said minimum gap is located at a position spaced from said optical axis by an amount approximately equal to 0.5 to 3 times the rotor offset.

8. An apparatus as claimed in claim 2, wherein said stationary film support element is an optical element located in a housing, and wherein said housing is contoured to reduce the width of the film passage to approximate said minimum gap upstream and downstream of said film support element.

9. An apparatus as claimed in claim 8, further comprising suction means in said housing for drawing film towards said extension downstream of the lens element.

10. An apparatus as claimed in claim 2, wherein the rotor is rotatable in a generally vertical plane about a generally horizontal axis.

11. In a rolling loop camera or projector having a rotor which is rotatable about an axis and which has a defined radius of curvature centered on said axis, stator means co-operating with the rotor to define a film passage, and a film support element having a film supporting surface forming part of said film passage;

the improvement comprising said film support surface having a defined radius of curvature centered on an optical axis, said radius of curvature of the rotor being significantly smaller than the radius of curvature of the film support surface and said rotational axis of the rotor being offset from said optical axis in a direction towards said film input location by an amount sufficient to provide a predetermined minimum gap between the rotor and the film support surface at a point upstream of said optical axis in the direction of film travel along said film passage.

* * * * *